United States Patent [19]
Demogenes et al.

[11] 3,981,448
[45] Sept. 21, 1976

[54] COOLED INFRARED SUPPRESSOR

[75] Inventors: Christos Demogenes, Pacific Palisades, Calif.; Robert A. Stone, Arlington, Va.

[73] Assignee: The Garrett Corporation, Los Angeles, Calif.

[22] Filed: Apr. 23, 1970

[21] Appl. No.: 31,108

[52] U.S. Cl. ............................ 239/127.3; 60/265; 60/271
[51] Int. Cl.² ...................................... B64D 33/04
[58] Field of Search ......... 239/265.11, 127.1, 127.3; 60/271, 39.66, 266

[56] References Cited
UNITED STATES PATENTS

| | | |
|---|---|---|
| 2,664,700 | 1/1954 | Benoit .......................... 239/265.25 |
| 2,825,204 | 4/1958 | Kadosch et al. ..................... 60/263 |
| 3,210,934 | 10/1965 | Smale ................... 60/265 |
| 3,428,257 | 2/1969 | Kentfield et al. ..................... 60/271 |

*Primary Examiner*—Samuel Feinberg
*Attorney, Agent, or Firm*—Albert J. Miller

[57] ABSTRACT

An infrared suppressor for use with an engine to receive the engine exhaust gases from the engine exhaust flange. Individual panels, cooled by a combination of convection and film cooling techniques, make up the suppressor. The suppressor may be configured as an axisymmetrical plug, a single or double rectangular scoop, or any number of other geometrics.

27 Claims, 11 Drawing Figures

INVENTORS.
CHRISTOS DEMOGENES,
ROBERT A. STONE,

By Albert J. Miller
ATTORNEY

INVENTORS.
CHRISTOS DEMOGENES,
ROBERT A. STONE,

By Albert J. Miller
ATTORNEY

COOLED INFRARED SUPPRESSOR

BACKGROUND OF THE INVENTION

The advent of infrared radiation homing weapons has greatly increased the vulnerability of aircraft such as airplanes, missiles, and helicopters to air-and-ground launched missile attack. The propulsion means for the aircraft invariably include hot metal parts that radiate a strong infrared radiation signal making them excellent targets for infrared radiation directed missiles. The hot metal parts are normally associated with either the gas turbine or jet engine exhaust system. In order to decrease the vulnerability of aircraft, it is necessary to reduce or suppress this infrared radiation signal or signature emanating therefrom. While certain advancements have been made in this direction, considerably further effort is still required to produce satisfactory results.

SUMMARY OF THE INVENTION

The present invention comprises a cooled infrared suppressor combining convection and film cooling techniques to cool the surfaces in contact with the hot exhaust gases from an infrared source. The individual suppressor panels are made of a single sandwich combining a high performance, plate fin, heat transfer matrix within an external shroud that distributes the cooling air to the heat transfer matrix. The cooling air enters the fin matrix, flows through the fin matrix performing the convection cooling and is dumped into the exhaust gas in a manner so as to provide the film cooling for downstream panel. Various cooling air flow patterns and openings are utilized in the panels.

The invention further comprises an infrared suppressor having a basic configuration of a side exhaust scoop, undergoing a transition from a circular cross section to a single flattened (rectangular or elliptical) side deflecting scoop or alternately from a circular cross section to a double flattened (rectangular or elliptical) side exhaust scoop.

DESCRIPTION OF THE PREFERRED EMBODIMENTS

Figure 1:
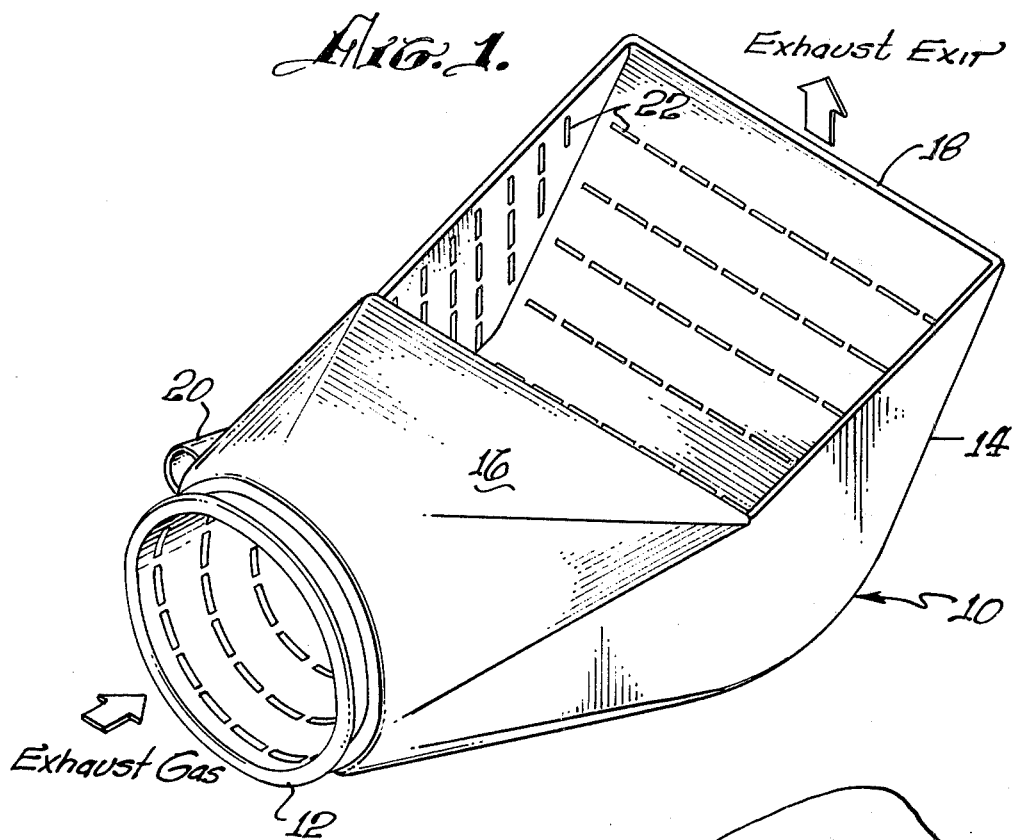
FIG. 1 is a schematic view of the single scoop infrared suppressor of the present invention.

As illustrated in FIG. 1, the infrared suppressor 10 comprises a circular engine-mounted ring or inlet 12 to receive the exhaust gases from an aircraft propulsion means, such as a gas turbine or jet engine. The suppressor comprises a transition section 16 including a scoop 14 which deflects the exhaust gases received by the circular engine mount ring 12 out one side of the suppressor 10 through a flattened exhaust exit or outlet 18 which may be either rectangular or elliptical in shape. At one side of the suppressor is a cooling air inlet 20 which provides air which is exhausted to the interior of the suppressor through slots 22.

Figure 2:
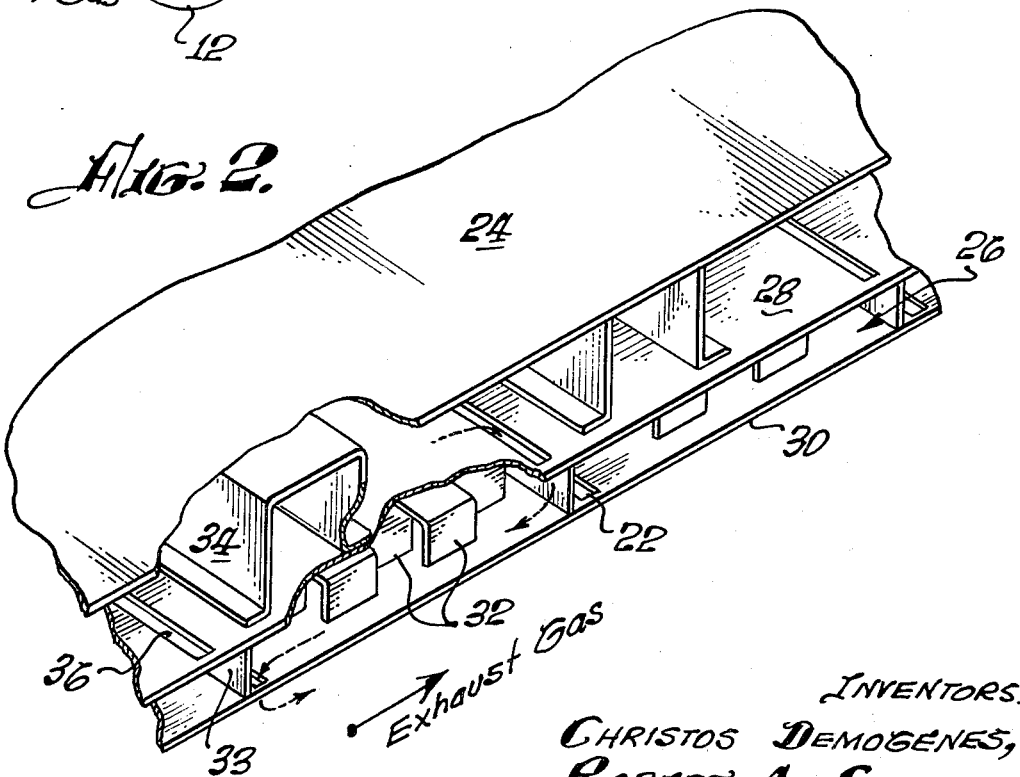
FIG. 2 is an end view partially cut away of a cooled infrared suppressor panel which can be utilized in the infrared suppressor of FIG. 1.

The suppressor 10 is made up of a series of cooled panels, an example of which is illustrated in FIG. 2. The panels comprise an outer shroud 24 and a heat transfer matrix 26. The matrix is a plate fin sandwich comprising plates 28 and 30 separated by heat transfer surfaces such as fins 32. The shroud 24 is supported on the heat transfer matrix by intermittently spaced stand-offs 34. Slots 36 in plate 28 permit the flow of air from the shroud to the matrix, while slots 22 exhaust the air into the interior of the suppressor. The matrix 26 may be divided into a series of individual compartments by spacers 33. Each compartment would include at least one slot 36 and one slot 22. The flow of coolant through the compartments is shown in dashed line arrows.

In operation, the cooling air enters the suppressor 10 through the cooling air inlet 20 and is distributed throughout the shroud 24. From the shroud 24, the cooling air is distributed to the heat transfer matrix 26 and after passing through the fin matrix is exhausted into the interior of the suppressor. The film cooling is provided in the interior of the infrared suppressor by the cooling air exiting from the slots 22, while convective cooling of the interior surface is provided by the flow of cooling air through the plate fin matrix. The flow of air through the shroud and the plate fin matrix is manifolded to various flow passages by the intermittent location of the stand-offs 34 and the slots located in the plate fin matrix. There is little or no need for any insulation on the external surface of the suppressor. This approach considers the insulation of externally visible hot parts not contacted by exhaust gas, the cooling externally of visible hot parts that are contacted by the hot gas and the shielding externally of visible parts from view.

Figure 3:
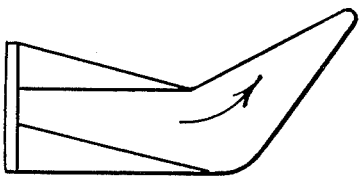
FIG. 3 is a schematic view of a single scoop infrared radiation suppressor configuration.
Figure 4:
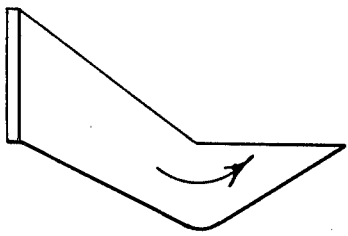
FIG. 4 is a schematic view of an alternate single scoop infrared radiation suppressor configuration.
Figure 5:
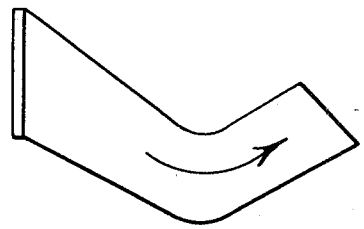
FIG. 5 is a schematic view of another alternate single scoop infrared radiation suppressor configuration.

The suppressor configuration should minimize the surface areas which have to be cooled and therefore result in minimum performance penalties to the aircraft. In the basic configuration, the transition is made from a round exhaust to a rectangular duct with an aspect ratio of about 2½ to 1 which provides minimum turning losses. The single rectangular scoop can take the configuration of either FIGS. 3, 4, or 5 or other similar configurations. The direct viewing of the radiation source from the suppressor outlet is prohibited in all cases. The single scoop is easily cooled and relatively simple in terms of fabrication. This geometry is of a minimum size and will therefore have near minimum cooling requirements.

The outer skin of the suppressor need not be cooled since it is not in direct contact with exhaust gases. The outer skin temperature will be close to the cooling air temperature. Film cooling achieves a reduction of the heat input from the exhaust gases to the inner surface. The combination of convection and film cooling require less coolant to maintain the surface at the desired temperature and makes very effective use of the coolant.

The internal surfaces of the suppressor or certain portions thereof, may be coated with a highly absorbing surface coating, such as oxidized structural metal to minimize reflected radiation. The oxide surfaces are highly diffuse rather than specular, thus further reducing the reflected radiation. They should not be degraded by oil or carbon deposits since they have similar absorptivity properties.

Since the addition of the infrared radiation suppressor on the exhaust of a gas turbine or jet engine will affect the performance of an engine in several ways, there will invariably be some loss of shaft power due to the increase in turbine back pressure resulting from the pressure drop associated with the engine exhaust gases flowing through the suppressor. In addition, there will be a direct power loss in supplying the cooling air flow through the suppressor either through bleeding the engine compressor to run a fan or injector or shaft power to operate a fan directly or indirectly by electrical or hydraulic means. In addition, the sideways discharge of the suppressor will tend to lessen whatever contribution is made by jet thrust.

Accordingly, it is necessary to configure the suppressor in such a way as to impose as little back pressure upon the engine as possible and to minimize the cooling requirements which the present invention does. The single scoop configurations utilize geometric advantages with bending a rectangular duct around its minor dimension. The scoop makes a transition from a circular cross section at the engine exhaust to a flattened (elliptical or rectangular) cross section at the initial exhaust exit line. This design is relatively simple and would appear to be applicable to most types of power plant installions.

Figure 6:
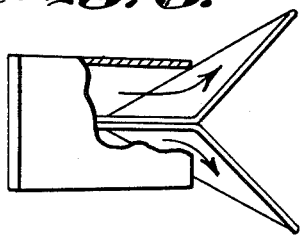
FIG. 6 is a schematic view of a double scoop infrared radiation suppressor.

The double rectangular scoop illustrated in FIG. 6 has much the same features as the single scoop but provides a more nearly square aspect from the rear and splitting the exhaust flow can cancel out undesirable side thrust components from the exhaust. The double scoop is somewhat smaller than the single scoop and provides generally more favorable packaging dimensions and is more apt to fit into existing cowling outlines.

Figure 7:
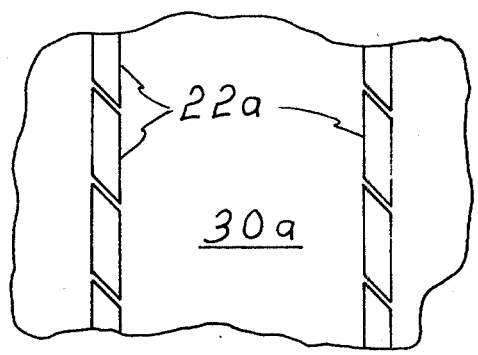
FIG. 7 is a partial plan view of an alternate cooled infrared suppressor panel.
Figure 8:
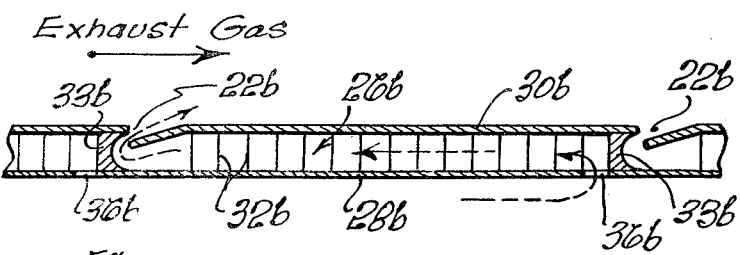
FIG. 8 is a partial end view of another alternate cooled infrared suppressor panel.

In order to improve the heat transfer characteristics of the infrared suppressor, the alternate cooled panels of FIGS. 7 and 8 may be utilized. As shown in FIG. 7, overlapping parallelogram slots 22a may be provided to insure that there are no spaces across the panel where coolant is not discharged.

The matrix 26b of FIG. 8 includes gas contacting plate 30b and plate 28b around heat transfer surfaces 32b. The spacers 33b between plates 30b and 28b have a semi-circular surface to direct the coolant out the opening 22b in the general direction of the exhaust gas flow. Slots 36b permit the entry of coolant into the matrix 26b.

Figure 9:
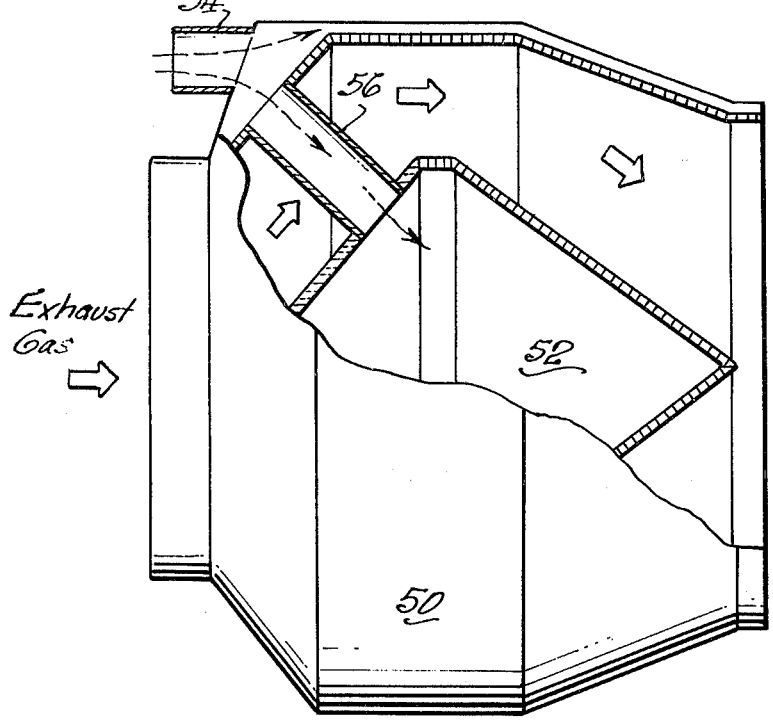
FIG. 9 is a partial section of a plug type cooled infrared suppressor for the novel cooled panels of the present invention.

In each of the panels so far illustrated, the coolant has flowed through the matrix in a direction counter to the flow of exhaust gases over the panel. While in many applications, this will be advantageous from a heat transfer standpoint, other considerations may require alternate flow configurations. Likewise, alternate infrared suppressor geometrics, such as the plug type suppressor of FIG. 9 may dictate other configurations.

The plug type suppressor comprises a divergent-convergent nozzle or casing 50 having a conically shaped plug 52 disposed therein. Both the casing 50 and plug 52 would be constructed of cooled infrared suppressor panels such as those previously described. Alternately, the panels of FIGS. 10 and 11 may be utilized. In either case, a coolant inlet 54 would be provided in the casing 50 and a plurality of struts 56, including coolant passages, would support the plug 52 within the casing 50.

Figure 10:
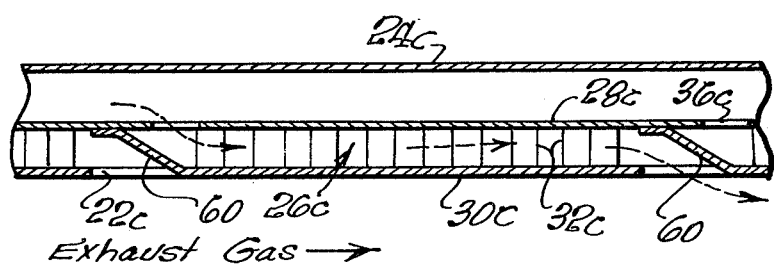
FIG. 10 is a partial end view of still another alternate cooled infrared suppressor panel.
Figure 11:
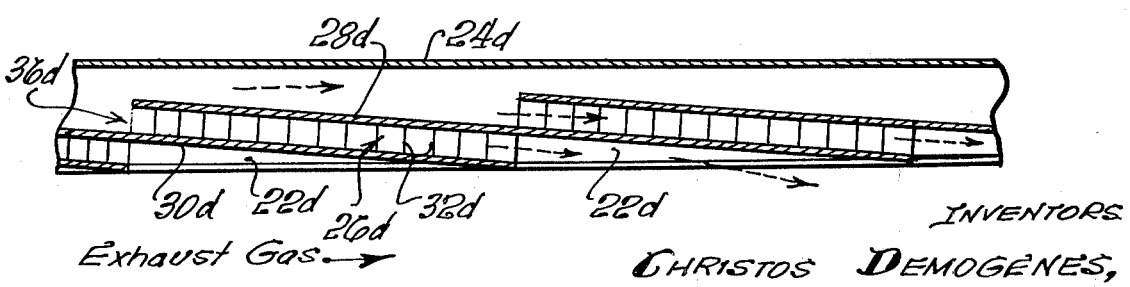
FIG. 11 is a partial end view of yet another alternate cooled infrared suppressor panel.

In the panels of FIGS. 10 and 11 the flow of coolant through the matrix is in the same direction as the exhaust gases over the panel. The FIG. 10 panel comprises a shroud 24c and heat transfer matrix 26c. The matrix 26c comprises plates 28c and 30c separated by heat transfer surfaces 32c. Openings 36c in plate 28c permit the flow of coolant into the matrix 26c while openings 22c exhaust the coolant from the matrix 26c. The openings 22c may be a single elongated slot extending across the entire panel and the coolant may be directed outward by a shaped portion 60 of the plate 30c.

The panel of FIG. 11 includes the shroud 24d and a heat transfer matrix 26d positioned at a slight angle to the shroud 24d. The matrix comprises plates 28d and 30d around fins 32d with inlet opening 36d and discharge opening 22d. The slight angle to the matrix 26d directs the coolant out into the exhaust at this same angle over a wider area of panel.

The cooled infrared suppressor panels of the present invention can be easily fabricated of sheet material components. The size, configuration, and maintenance considerations indicate that a segmented fabrication approach is probably the most feasible. Fabrication will basically involve sheet metal forming, brazing and machining. The triple skin two-layer sandwich construction of the panels will be inherently stiff and resistant to acoustically induced panel vibration.

While specific embodiments of the engine have been illustrated and described, it is to be understood that these embodiments are provided by way of example only and that the invention is not to be construed as being limited thereto but only by the proper scope of the following claims.

What we claim is:

1. An infrared suppressor for the exhaust of an infrared radiation source comprising a generally scoop-shaped duct having an annular inlet to receive the exhaust from the infrared radiation source and a generally flattened outlet to discharge the infrared suppressed exhaust from said duct, said outlet directed off to one side from said inlet to prevent the direct viewing of the radiation source from said outlet, said duct including means to cool the exhaust between said inlet and said outlet comprising a heat transfer matrix including a pair of spaced plates separated by a plurality of transverse spacer elements to form a plurality of separate transversely extending compartments, the surface of one of said pair of heat transfer matrix plates exposed to the exhaust and having a plurality of openings therein with each separate compartment having at least one opening to discharge coolant therefrom into the exhaust and an outer shroud plate disposed around and spaced apart from the other of said pair of spaced heat transfer matrix plates form a coolant header around said heat transfer matrix to receive and distribute a coolant to the separate compartments of said heat transfer matrix, the other of said heat transfer matrix plates having a plurality of openings therein with each separate compartment having at least one opening to receive coolant from said coolant header.

2. The infrared suppressor of claim 1 wherein the plurality of coolant discharge openings in each individual heat transfer matrix compartment are at the downstream end of each compartment and the plurality of coolant receiving openings in each compartment are at the upstream end of each compartment such that the flow of coolant through said matrix compartments is in the same direction as the flow of exhaust through said suppressor.

3. The infrared suppressor of claim 2 wherein the pair of heat transfer matrix spaced plates are inclined with respect to said outer shroud plate.

4. The infrared suppressor of claim 1 wherein the plurality of coolant discharge openings in each individual heat transfer matrix compartment are at the upstream end of each compartment and the plurality of cooling receiving openings in each compartment are at the downstream end of each compartment such that the flow of coolant through said matrix compartments is counter to the flow of exhaust through said suppressor.

5. The cooled infrared suppressor panel of claim 4 wherein said spacer elements include a shaped surface to direct the flow of coolant outward from each compartment in a direction substantially the same as the flow of exhaust.

6. An infrared suppressor for the exhaust of an infrared radiation source comprising a generally scoop-shaped duct having a tubular inlet to receive the exhaust from the infrared radiation source and a generally rectangular outlet to discharge the infrared suppressed exhaust from said duct, said outlet directed off to one side from said inlet to prevent the direct viewing of the radiation source from said outlet, said duct including an inner plate having one surface exposed to the infrared radiation source exhaust, an intermediate plate spaced around said inner plate to define a plurality of heat transfer matrix compartments, and an outer plate spaced around said intermediate plate to define a coolant header therebetween, said outer plate having a coolant inlet for the entry of a coolant to the coolant header, said intermediate plate having a plurality of openings to permit the flow of coolant into the plurality of matrix compartments and said inner plate having a plurality of openings to discharge coolant from said compartments into the exhaust.

7. An infrared suppressor for the exhaust of an infrared radiation source comprising:
an annular inlet portion to receive the exhaust from said infrared radiation source;
a substantially rectangular outlet portion to discharge the infrared suppressed exhaust at an obtuse angle from said annular inlet portion to prevent the direct viewing of the radiation source from said substantially rectangular outlet; and
a transition portion extending between said annular inlet portion and said substantially rectangular outlet portion to conduct the exhaust from said inlet to said outlet, said transition portion including means to cool the exhaust between said inlet and said outlet,
said cooling means comprising a heat transfer matrix including a pair of spaced plates separated by a plurality of transverse spacer elements to form a plurality of separate, transversely extending, compartments, the surface of one of said pair of heat transfer matrix plates exposed to the exhaust and having a plurality of openings therein with each separate compartment having at least one opening to discharge coolant therefrom into the exhaust and an outer shroud plate disposed around and spaced apart from the other of said pair of spaced heat transfer matrix plates to form a coolant header around said heat transfer matrix to receive and distribute a coolant to the separate compartments of said heat transfer matrix, the other of said heat transfer matrix plates having a plurality of openings therein with each separate compartment having at least one opening to receive coolant from said coolant header.

8. The infrared suppressor of claim 7 wherein said heat transfer matrix includes means to discharge the coolant from said matrix into the exhaust in a preselected direction with respect to the flow of exhaust.

9. An infrared suppressor for the exhaust of an infrared radiation source comprising:
an annular inlet portion to receive the exhaust from said infrared radiation source;
a substantially rectangular outlet portion to discharge the infrared suppressed exhaust at an obtuse angle from said annular inlet portion to prevent the direct viewing of the radiation source from said substantially rectangular outlet; and
a transition portion extending between said annular inlet portion and said substantially rectangular outlet portion to conduct the exhaust from said inlet to said outlet,
said transition portion including means to cool the exhaust between said inlet and said outlet comprising a heat transfer matrix having one surface exposed to the infrared radiation source exhaust and an outer shroud disposed around said heat transfer matrix to receive and distribute a coolant to said heat transfer matrix, said heat transfer matrix including a plurality of openings in the surface exposed to the infrared radiation source exhaust to discharge coolant into the exhaust,
said heat transfer matrix comprising a plurality of separate compartments, each compartment having at least one opening to receive coolant from said outer shroud at the downstream end of said compartment and at least one opening to discharge coolant at the upstream end of said compartment such that the flow of coolant through said matrix is counter to the flow of exhaust through said suppressor.

10. An infrared suppressor for the exhaust of an infrared radiation source comprising:
an annular inlet portion to receive the exhaust from said infrared radiation source;
a first substantially rectangular outlet portion to discharge the infrared suppressed exhaust at a first obtuse angle from said annular inlet portion;
a second substantially rectangular outlet portion to discharge the infrared suppressed exhaust at a second obtuse angle from said annular inlet portion, said second obtuse angle substantially the same as said first obtuse angle but rotated approximately 180° around the axis of said annular inlet portion, the radiation source not directly visible from the first or second outlets; and a transition portion extending between said annular inlet portion and said first and second outlet portions to conduct the exhaust from said inlet to said first and second outlets, and including means to cool the exhaust between said inlet and said outlets.

11. The infrared suppressor of claim 10 wherein said transition portion comprises a heat transfer matrix having one surface exposed to the infrared radiation source exhaust and an outer shroud disposed around said heat transfer matrix to receive and distribute a coolant to said heat transfer matrix, said heat transfer matrix including a plurality of openings in the surface exposed to the infrared radiation source exhaust to discharge coolant into the exhaust.

12. The infrared suppressor of claim 11 wherein said heat transfer matrix includes a plurality of offset corrugated fins.

13. The infrared suppressor of claim 11 wherein said heat transfer matrix comprises a plurality of separate compartments, each compartment having at least one opening to receive coolant from said outer shroud at one end of said compartment and at least one opening to discharge coolant at the other end of said compartment.

14. The infrared suppressor of claim 13 wherein said coolant receiving openings are at the downstream end of said compartment and said coolant discharge openings are at the upstream end of said compartment such that the flow of coolant through said matrix is counter to the flow of exhaust through said suppressor.

15. The infrared suppressor of claim 13 wherein said coolant receiving openings are at the upstream end of said compartment and said coolant discharge openings are at the downstream end of said compartment such that the flow of coolant through said matrix is in the same direction as the flow of exhaust through said suppressor.

16. A coolant infrared suppressor panel comprising: a heat transfer matrix including;
a pair of spaced parallel plates; a plurality of transverse spacer elements disposed between said spaced parallel plates to form a plurality of separate, transversely extending, compartments therewith, each separate compartment having at least one opening to discharge coolant therefrom; and heat transfer surfaces disposed within said compartments between said spaced plates; and
coolant header means disposed around said heat transfer matrix to distribute a coolant to the individual compartments of said heat transfer matrix, each separate compartment having at least one opening to receive coolant from said header.

17. A cooled infrared suppressor panel comprising: a heat transfer matrix including openings to discharge a coolant therefrom; and means to distribute a coolant to said heat transfer matrix, said coolant distribution means comprising an outer shroud disposed around said heat transfer matrix to receive and distribute a coolant to said heat transfer matrix, said heat transfer matrix inclined with respect to said outer shroud to receive coolant at one end and discharge coolant from the other end thereof.

18. A cooled infrared suppressor panel comprising:
a first plate having one surface exposed to the exhaust of an infrared radiation source;
a second plate spaced apart from said first plate;
a plurality of spacer elements disposed between said first and said second plates to define a plurality of compartments therewith;
a plurality of heat transfer surfaces disposed within the compartments formed between said first and second plates; and
a third plate spaced from said second plate to define a coolant header therebetween;
said second plate having a plurality of openings to permit the flow of coolant from the header into the plurality of compartments and said first plate having a plurality of openings to discharge coolant from said compartments into the infrared radiation source exhaust.

19. The cooled infrared suppressor panel of claim 18 wherein the openings in said second plates are at the downstream end of said compartments and the coolant discharge openings in said first plates are at the upstream end of said compartments such that the flow of coolant through said compartments is counter to the flow of exhaust past said first plates.

20. The cooled infrared suppressor panel of claim 18 wherein the openings in said second plate are at the upstream end of said compartments and the coolant discharge openings in said first plates are at the downstream end of said compartments such that the flow of coolant through said compartments is in the same direction as the flow of exhaust past said first plates.

21. The cooled infrared suppressor panel of claim 18 and in addition means to discharge the coolant from said compartments into the exhaust at a preselected direction with respect to the flow of exhaust.

22. The cooled infrared suppressor panel of claim 18 wherein said spacer elements include a shaped surface of direct the flow of coolant outward from said compartments in a direction substantially the same as the flow of exhaust.

23. The cooled infrared suppressor panel of claim 22 wherein said first plate includes an indented portion cooperating with the shaped surface of said spacer element to give direction to the outward flow of the coolant into the exhaust.

24. The cooled infrared suppressor of claim 20 wherein said first and second plates are parallelly disposed to each other and at an angle with respect to the third plate.

25. An infrared suppressor for the exhaust of an infrared radiation source comprising:
a generally tubular nozzle including a heat transfer matrix and a coolant header disposed around said heat transfer matrix to receive and distribute a coolant to said heat transfer matrix;
a generally conically-shaped plug member coaxially mounted within said tubular nozzle, said plug member of sufficient dimension to prevent the direct viewing of the infrared source from the outlet end of said nozzle and including a heat transfer matrix; and
means disposed between the coolant header of said nozzle and the interior said plug member for the flow of coolant therebetween;
said nozzle heat transfer matrix and said plug member heat transfer matrix comprising: a pair of spaced plates; a plurality of transverse spacer elements disposed between said spaced parallel plates to form a plurality of separate, transversely extending, compartments therewith, each compartment having at least one opening to discharge coolant therefrom into the exhaust and at least one opening to receive coolant from said coolant header; and heat transfer surfaces disposed within said compartments between said spaced plates.

26. The infrared suppressor of claim 25 wherein the heat transfer matrix compartment coolant discharge openings are at the upstream end of each compartment and the coolant receiving openings are at the downstream end of each compartment such that the flow of coolant through said matrix compartments is counter to the flow of exhaust through said suppressor.

27. The infrared suppressor of claim 25 wherein the heat transfer matrix compartment coolant discharge openings are at the downstream end of each compartment and the coolant receiving openings are at the upstream end of each compartment such that the flow of coolant through said matrix compartment is in the same direction as the flow of exhaust through said suppressor.

* * * * *